(No Model.)

F. A., H. L. & W. E. JACOBS.
PULLEY OR WHEEL.

No. 320,475. Patented June 23, 1885.

Witnesses:
Robt. L. Fenwick
Edw. F. Simpson Jr.

Inventor:
Felix A. Jacobs
Henry S. Jacobs
William E. Jacobs, by
their attys,
Fenwick & Lawrence N. PETERS, Photo-Lithographer, Washington, D. C.

United States Patent Office.

FELIX A. JACOBS, HENRY L. JACOBS, AND WILLIAM E. JACOBS, OF COLUMBUS, OHIO.

PULLEY OR WHEEL.

SPECIFICATION forming part of Letters Patent No. 320,475, dated June 23, 1885.

Application filed December 11, 1884. (No model.)

*To all whom it may concern:*

Be it known that we, FELIX A. JACOBS, HENRY L. JACOBS, and WILLIAM E. JACOBS, citizens of the United States, residing at Columbus, in the county of Franklin and State of Ohio, have invented a new and useful Metal Wheel, of which the following is a specification.

Our invention relates to metallic wheels for use on vehicles of every description, and for other suitable purposes; and it consists of a continuous felly or rim, a number of interlocking elastic spokes, and a center piece, which latter serves as a key for keeping the parts together, at the same time that it may serve as an eye or hub.

Figure 1:
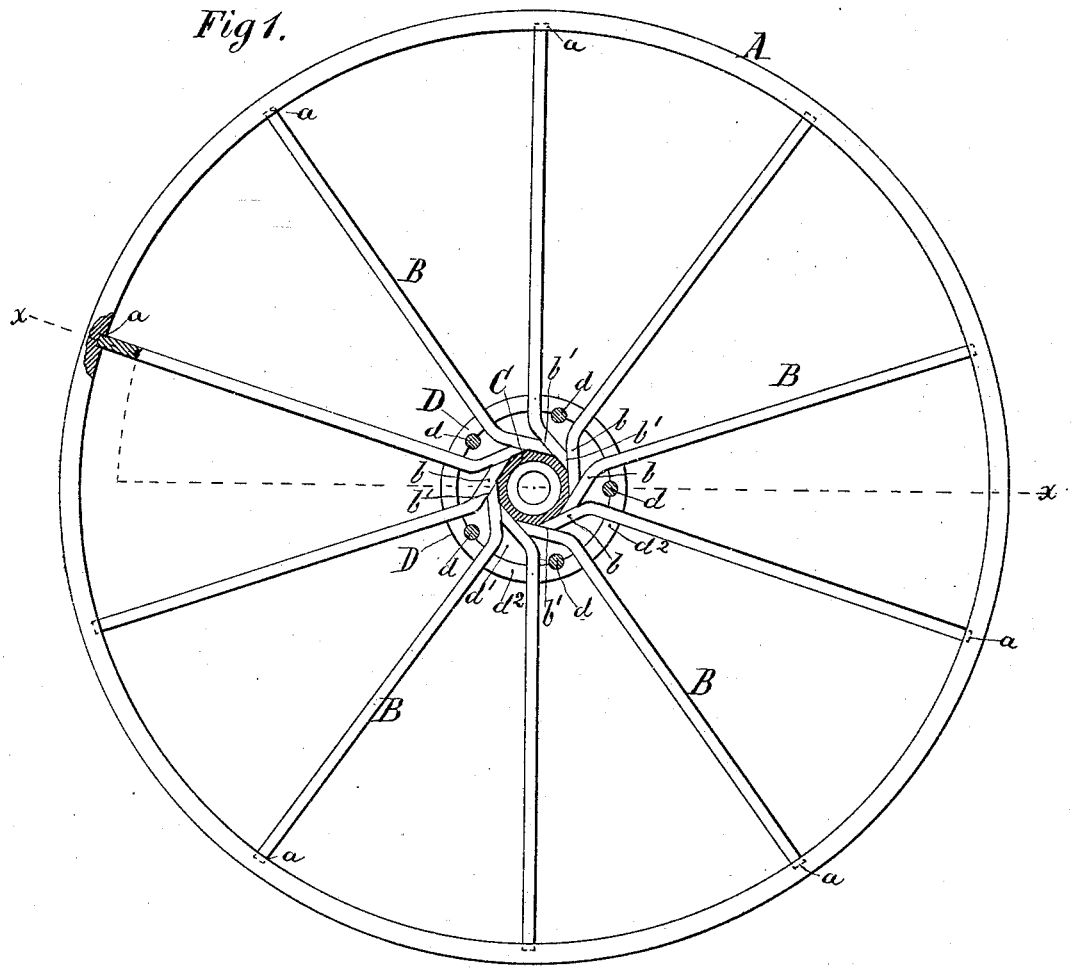
Figure 2:
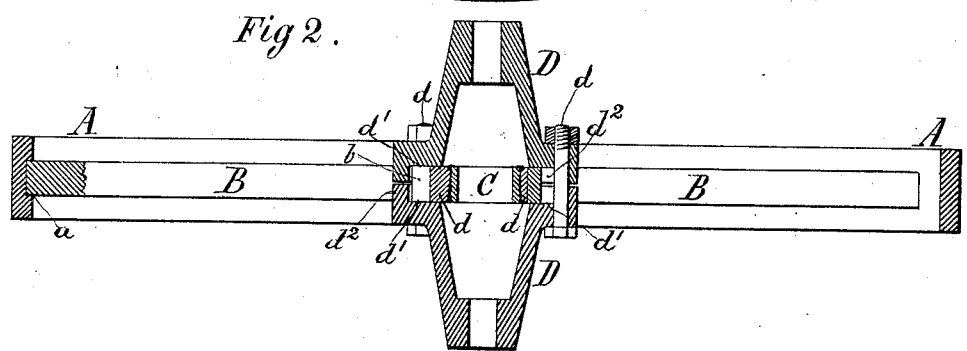
Figure 3:
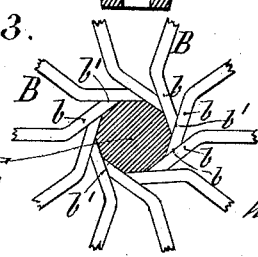

In the accompanying drawings, Figure 1 is a side view of our improved metal wheel, showing a portion of the felly and a spoke in broken section, in order to show the mode of construction between said parts, and also showing by section that one-half of a hub-extension is removed in order to expose the mode of interlocking the inner ends of the spokes. Fig. 2 is a transverse section of the wheel complete in the line $x\,x$ of Fig. 1; and Fig. 3 is a detail view of another mode of carrying out our invention.

The letter A in said drawings represents an iron or other metallic rim or felly of our improved wheel, which felly is provided with shallow inner mortises, $a$. Into these mortises a number of steel spokes, B, are inserted. The inner end portions, $b$, of these spokes are bent at an angle so as to form a tangent to the hub or eye C, and the inner end faces, $b'$, are cut on such a bevel or angle that they will in succession touch and perfectly fit the end portions, $b$, as seen in Fig. 1. When the spokes B have all been inserted into the mortises $a$ of the rim or felly A, the end portions, $b$, will form a polygon around the axis of the wheel, and a hub or eye, C, of polygonal form on its outside, is then forcibly driven between the end portions, $b$, and the spokes thereby caused to bind in the sockets $a$ and upon one another at $b'$, and the wheel throughout rendered firm.

The wheel is laterally strengthened and adapted for use on carriages, wheelbarrows, and other structures by means of two half-hubs, D, connected by bolts $d$. These half-hubs are formed with flanges $d'$, having circular rims $d^2$, into half-notches of which the spokes are fitted, so that one half the width of each spoke is embedded in a half-notch in the rim of the flange of one half-hub, while the other half of the width of the spoke is embedded in the rim of the flange of the other half-hub. These half-hubs, by being very firmly clamped together by means of the bolts $d$, prevent lateral and radial disarrangement of the spokes while the wheel is subjected to the strain of practical use.

By making the hub or eye C slightly conical it can be very tightly wedged between the spokes, and the wheel thereby kept firm a long time, said hub being held in place by suitably riveting its smaller end over the inner spoke ends; and in the event of the wheel requiring tightening up, the half-hubs can be removed, the hub or eye C driven up tight and riveted, the half-hubs refastened to the wheel, and the wheel will then be in good condition for use.

Our invention is suitable as well for wheels on an axle to which the half-hubs are loosely fitted as for revolving-axles or shafts to which the half-hubs are suitably fastened. In the latter case the hub or eye may be omitted, and in place of it the shaft E may be provided with a polygonal formation, as shown in section in Fig. 3, which portion of the shaft is driven between the spokes the same as the hub or eye C. We have also found that when the diameter of the wheel is comparatively small and the width of the felly and spokes very great the wheel may be safely constructed without half-hubs, as then the width of the inner spoke ends affords sufficient leverage to withstand lateral strains without other assistance.

There are objections to iron wheels which have their parts fastened together by modes other than welding, and these objections we obviate by simplicity of construction and reduction of cost, as well as increasing their durability. Our iron wheels provide for a reasonable elasticity, such as is found in wooden wheels, and affords a ready means for tightening up. These benefits we have attained more perfectly by providing for the use of spokes of steel, and bending them as described, and having the radial strain come upon the wheel in a manner to reduce the concussion of the fitting surfaces of the parts of the same; also, by tightening up the wheel with one central key, which can be adjusted with a few blows of a hammer, which key is located in the least exposed part of the wheel—viz., the center.

Our invention is applicable in the construction of carriage, wagon, cart, wheelbarrow, or truck wheels, or driving-pulleys and fly-wheels and car-wheels.

While we have stated that we make use of steel for the construction of our spokes, any other metal properly prepared, so as to be elastic and durable enough for the purpose, may be adopted instead of steel.

What we claim as our invention, and desire to secure by Letters Patent, is—

1. The combination of a continuous iron felly or rim, A, having inner mortises, a, spokes B, having centrally interlocking end portions, b, and a central tightening hub or eye or key, C, substantially as and for the purpose described.

2. The combination of the rim or felly A, centrally-interlocking elastic spokes B, central tightening-key, hub, or eye, C, and clamping half-hubs D, substantially as and for the purpose described.

FELIX A. JACOBS.
HENRY L. JACOBS.
WILLIAM E. JACOBS.

Witnesses:
   J. D. SULLIVAN,
   WILSON WRAY.